(12) United States Patent
Lindlau et al.

(10) Patent No.: US 9,229,214 B1
(45) Date of Patent: Jan. 5, 2016

(54) METHOD AND SYSTEM FOR MITIGATING PARALLAX IN GUN SIGHTS

(71) Applicant: Range Tactics LLC, Genesse Depot, WI (US)

(72) Inventors: Richard D. Lindlau, Waukesha, WI (US); Wayne B. Morgan, Lincoln, NE (US); Daniel R. A. Harder, Hartland, WI (US)

(73) Assignee: Range Tactics LLC, Genesee Depot, WI (US)

( * ) Notice: Subject to any disclaimer, the term of this patent is extended or adjusted under 35 U.S.C. 154(b) by 0 days.

(21) Appl. No.: 13/940,972

(22) Filed: Jul. 12, 2013

Related U.S. Application Data

(63) Continuation-in-part of application No. 13/152,487, filed on Jun. 3, 2011, now Pat. No. 8,484,881.

(60) Provisional application No. 61/380,374, filed on Sep. 7, 2010.

(51) Int. Cl.
  *G02B 23/00* (2006.01)
  *F41G 3/00* (2006.01)

(52) U.S. Cl.
  CPC .............. *G02B 23/00* (2013.01); *F41G 3/005* (2013.01)

(58) Field of Classification Search
  CPC ............ F41G 1/17; F41G 1/08; F41G 1/473; F41G 3/06; F41G 1/30; F41G 3/005; G02B 23/00

USPC .............. 42/113–115, 119–120, 122–123, 42/129–133, 135, 139–141, 143–145; 359/428

See application file for complete search history.

(56) References Cited

U.S. PATENT DOCUMENTS

| | | | | | |
|---|---|---|---|---|---|
| 2,167,012 | A | * | 7/1939 | Tetzlaff | F41G 1/04 124/83 |
| 2,353,133 | A | * | 7/1944 | Gorman | F41G 1/04 42/130 |
| 2,770,041 | A | * | 11/1956 | Boll | E41G 1/08 42/130 |
| 4,102,053 | A | * | 7/1978 | Colwell | F41G 1/06 335/285 |
| 6,289,625 | B1 | * | 9/2001 | Phares | F41G 1/383 42/111 |
| 6,865,022 | B2 | * | 3/2005 | Skinner | G02B 27/32 359/399 |
| 2004/0025397 | A1 | * | 2/2004 | Malley | F41G 1/38 42/122 |
| 2007/0062092 | A1 | * | 3/2007 | Roes | F41G 1/30 42/140 |

* cited by examiner

Primary Examiner — Samir Abdosh
Assistant Examiner — John D Cooper
(74) Attorney, Agent, or Firm — Suiter Swantz pc llo

(57) ABSTRACT

A parallax mitigation device and method is disclosed. The parallax mitigation device can be used in a reflex sight having a front portion for receiving light and a rear portion for providing a visual of a target and a projection of an aiming point superimposed on the visual to a user. The parallax mitigating device is placed at one of: the front portion, the rear portion, or in an optical path between the front and rear portion of the reflex sight. The parallax mitigating device is configured for indicating a center of the visual provided to the user to facilitate parallax mitigation of the reflex sight.

17 Claims, 21 Drawing Sheets

METHOD AND SYSTEM FOR MITIGATING PARALLAX IN GUN SIGHTS

CROSS-REFERENCE TO RELATED APPLICATIONS

The present application is a continuation-in-part of and claims the benefit of U.S. Non-Provisional application Ser. No. 13/152,487, filed Jun. 3, 2011. Said U.S. Non-Provisional application Ser. No. 13/152,487, filed Jun. 3, 2011 claims the benefit of U.S. Provisional Application Ser. No. 61/380,374, filed Sep. 7, 2010. Said U.S. Non-Provisional application Ser. No. 13/152,487, filed Jun. 3, 2011, and said U.S. Provisional Application Ser. No. 61/380,374, filed Sep. 7, 2010 are hereby incorporated by reference in their entirety.

TECHNICAL FIELD

The disclosure generally relates to the field of gun sights, particularly to a method and system for mitigating parallax in gun sights.

BACKGROUND

Reflex sights are optical or computing sights that reflect a reticle image (or images) onto a combining glass for superimposition on the target. The M68 sight is a reflex sight. It uses a red aiming reference (collimated dot) and is designed for the "two eyes open" method of sighting. The dot follows the horizontal and vertical movement of the gunner's eye while remaining fixed on the target. The sight is parallax free beyond 50 meters and thus the shooter can place the dot of a properly zeroed weapon on a target regardless of its positioning the sight tube and hit the target at distances of 50 meters and greater. However, when zeroing the weapon or engaging targets at distances of 50 meters or closer the dot must be precisely centered to ensure accurate zeroing of weapon or accurate fire on targets. Failure to precisely center the red dot in the tube while zeroing the weapon will either cause difficulty in achieving a zero or if the red dot is maintained in the same non-centered position the soldier will have a false zero on his or her weapon and will be unsuccessful when engaging targets be they on a range or on the battlefield.

Parallax is an apparent displacement or difference in the apparent position of an object viewed along two different lines of sight, and is measured by the angle or semi-angle of inclination between those two lines. In the M68 series scopes this is caused by the fact that there are multiple lenses in the scope. Because of this the soldier may be required to make a visual estimation of center when zeroing this scope. This estimation may be difficult to accurately repeat and may be the most common and serious problem encountered by soldiers when zeroing.

SUMMARY

The present disclosure is directed to an apparatus. The apparatus includes a reflex sight and a parallax mitigating device. The reflex sight has a front portion for receiving light and a rear portion for providing a visual of a target and a projection of an aiming point superimposed on the visual to a user. The parallax mitigating device is placed at one of: the front portion, the rear portion, or in an optical path between the front and rear portion of the reflex sight. The parallax mitigating device is configured for indicating a center of the visual provided to the user to facilitate parallax mitigation of the reflex sight.

A further embodiment of the present disclosure is directed to a method for mitigating parallax in a reflex sight. The method includes: engaging a parallax mitigating device placed at one of: the front portion, the rear portion, or in an optical path between the front and rear portion of the reflex sight; locating a center position indicated by the parallax mitigating device; and placing the superimposed aiming point at the center position indicated by the parallax mitigating device to mitigate parallax of the reflex sight.

Another embodiment of the present disclosure is directed to an apparatus. The apparatus includes a reflex sight and means for mitigating parallax. The reflex sight has a front portion for receiving light and a rear portion for providing a visual of a target and a projection of an aiming point superimposed on the visual to a user. The parallax mitigating means is placed at one of: the front portion, the rear portion, or in an optical path between the front and rear portion of the reflex sight. The parallax mitigating means is configured for indicating a center of the visual provided to the user to facilitate parallax mitigation of the reflex sight.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
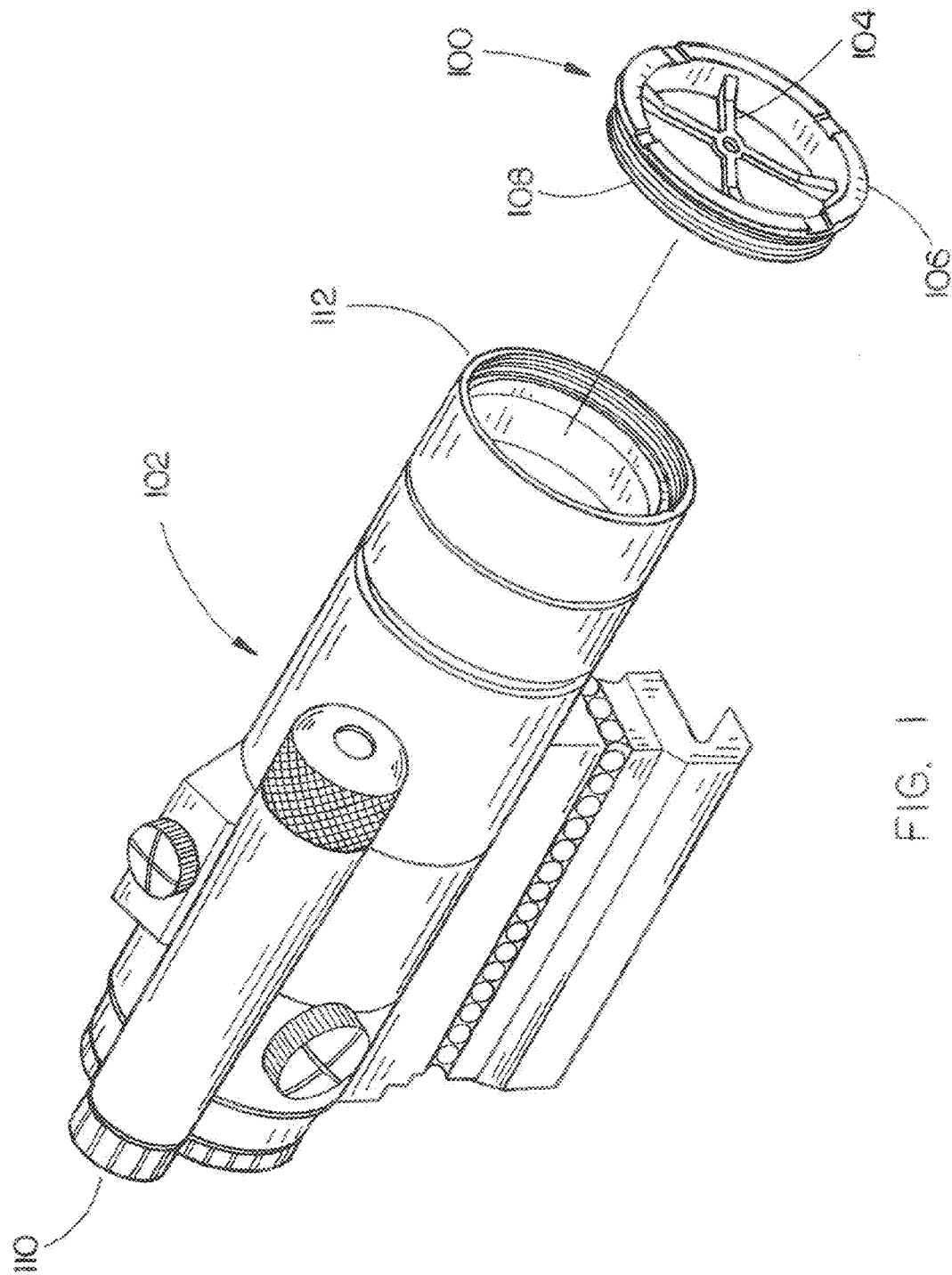
FIG. 1 is a perspective view of a parallax mitigation device and a red dot type scope.

Reference will now be made in detail to the subject matter disclosed, which is illustrated in the accompanying drawings.

Parallax in gun sights may cause a shooter difficulty in achieving a good zero. This in effect causes an enormous amount of wasted training time and excessive expenditure of ammunition. The lack of a good zero also reduces the soldier's confidence in their weapon and their ability to use it effectively. This in turn can compromise the safety of the individual soldier as well as the safety of their fellow soldiers. Red dot reflex sights, such as the M68, may be effectively parallax-free outside of a certain distance (e.g., 50 meters), meaning that while the red dot moves around the inside of sight based on eye position, it always represents the point of aim. However, parallax may still occur if the target is at a distance of 50 meters or closer.

The method and system for parallax mitigation of the present disclosure may save up to one third of the time now spent by the soldier while zeroing and qualifying which frees this time up for other training. This also means saving up to one third the ammunition resulting in the possible saving of millions of dollars of ammunition. This reduction of ammunition also benefits the environment as less lead ends up being used and expended. Furthermore, another important benefit is an accurately zeroed weapon increasing soldier effectiveness and survivability on the battlefield.

The zeroing of the M68 begins in the same manner as any other zero, with a grouping exercise to ensure the shooter is utilizing the proper fundamentals of marksmanship. This simple procedure requires the shooter to precisely center the red dot of his or her weapon for each and every shot which can be quite challenging. If this centering of the dot is not accomplished the soldier will have a difficult time grouping their shots to standard. The standard is to fire two three shot groups and have all six shots fall within a four centimeter circle at a distance of 25 meters. 25 meters being the established grouping and zeroing distance prescribed for us military weapons.

Several kinds of problems may arise during the grouping exercise. First, the soldier may not be able to maintain precise placement of the red dot for three shots in a row. The result of this is one of the largest contributing factors towards the soldier's inability to meet established grouping standards. The second error would be that the soldier may be able to visually place the red dot in the same place in relation to the center of the sight tube, but not in the same spot for consecutive shot groups. This may result in acceptable three shot groups but the location of these shot groups are scattered on the target and again the standards are not met. Furthermore, a third error may occur occasionally. This is when the soldier is able to maintain the dot in the same position consistently for multiple shot groups. This soldier is unfortunate as they will be able to zero their weapon quickly. The reason that this is unfortunate is that the zero achieved is a false zero. It simply shows consistent inconsistency and when the soldier moves to a qualification range or the battlefield they will not be successful. While failure on the range can be corrected, it destroys the soldiers' confidence in their equipment. Failure on the battlefield is another thing entirely and can result in an easily preventable loss of life.

The errors previously described are common as many soldiers are only firing for qualification on an annual basis and the amount of ammunition in many instances is limited. No matter the reason, the result is an inordinate amount of time, ammunition and frustration spent on what should be a simple task. The solution is the parallax mitigation/elimination device of the present disclosure. While the intent of the parallax mitigation device of the present disclosure is to alleviate the problems experienced by individuals attempting to zero and qualify with the aim point designed and produced for the M68 series of scopes, it is understood that the M68 series of scopes are merely exemplary, and that the parallax mitigation device of the present disclosure is applicable to any red dot type scope of similar designs.

Referring generally to FIGS. 1 through 7, a parallax mitigation device 100 for a reflex type gun sight/scope 102 (e.g., a red dot sight such as the M68) is shown. The scope 102 includes a front portion 112 for receiving light and a rear portion 110 for providing a visual of a target to the shooter. The parallax mitigation device 100 provides a reticle 104 (e.g., crosshairs) to enable the shooter to get consistent, precise placement of the red dot in the exact center of the visual on every shot. In one embodiment, the reticle 104 is enclosed in a generally cylindrical housing 106. The generally cylindrical housing 106 may have a threaded portion 108 for mounting to the front portion 112 of the scope 102. It is contemplated that other fastening mechanisms such as snap fit mechanisms, friction fit mechanisms, or the like may be utilized for securing the parallax mitigation device 100 to the scope 102.

Figure 2:
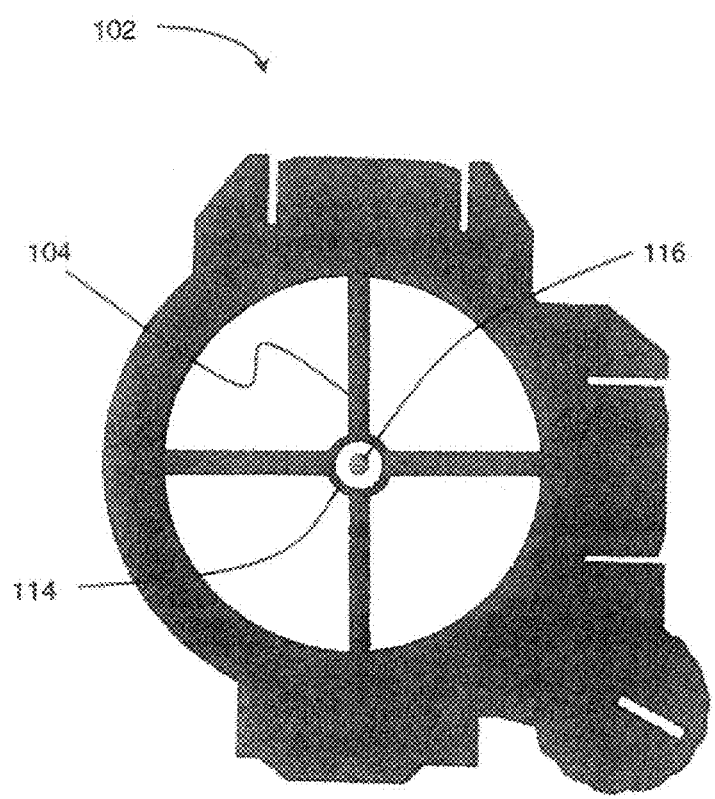
FIG. 2 is an illustration depicting the shooter's view through the red dot type scope with the parallax mitigation device installed
Figure 3:
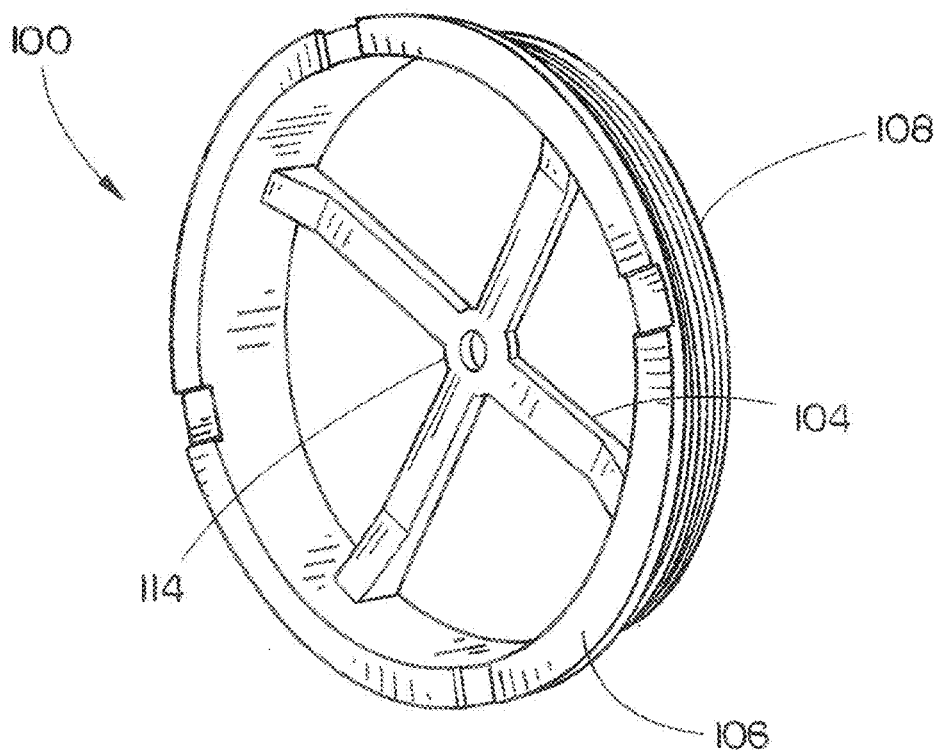
FIG. 3 is an isometric view of the parallax mitigation device illustrated in FIG. 1.
Figure 4:
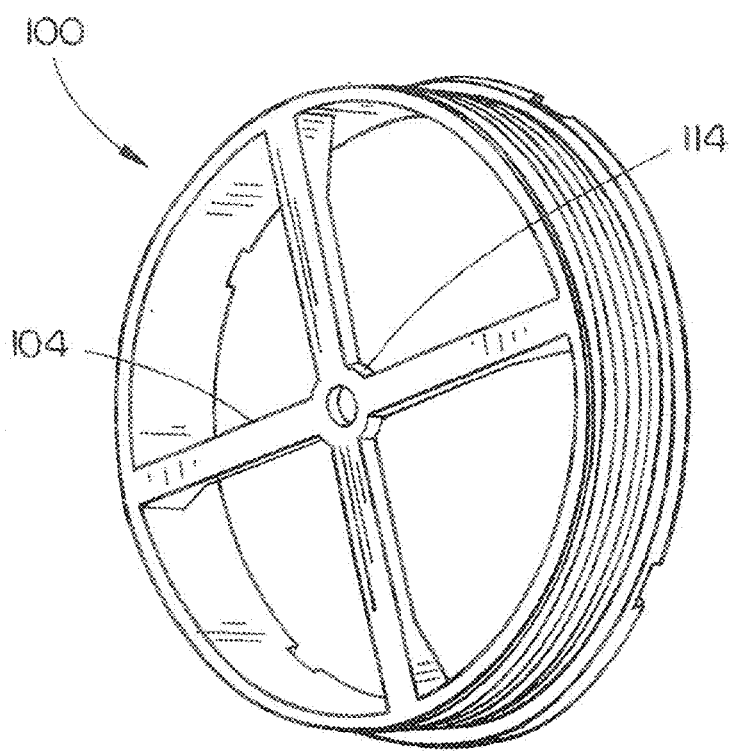
FIG. 4 is another isometric view of the parallax mitigation device illustrated in FIG. 1.
Figure 5:
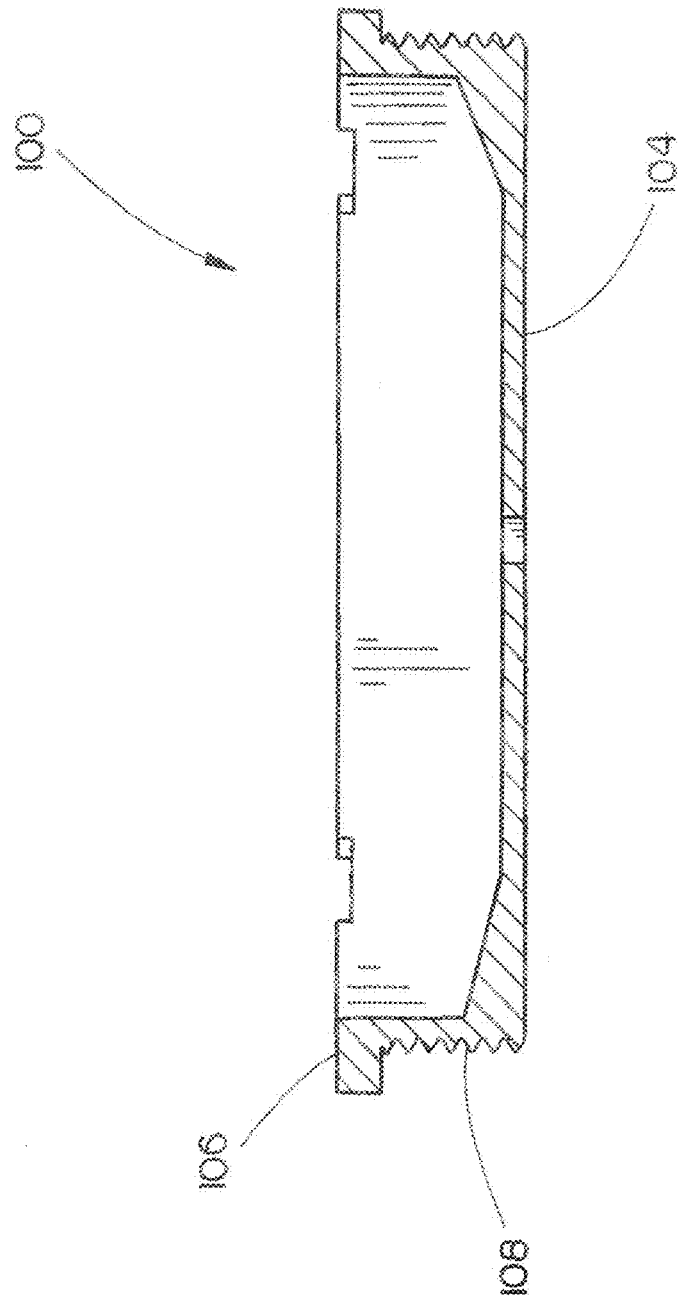
FIG. 5 is a cross-sectional view of the parallax mitigation device illustrated in FIG. 1.

FIG. 2 is an illustration depicting the shooter's view through the scope 102 with the parallax mitigation device 100 installed. In one embodiment, the reticle 104 are defined utilizing four equal length bars each having one end secured to the cylindrical housing of the parallax mitigation device 100 at the 12, 3, 6 and 9 o'clock positions (with respect to the orientation shown in FIG. 2). The other end of each of the four bars extends from the cylindrical housing towards the center and terminates at a point leaving a gap of approximately a few millimeters apart from each other. A connecting member 114 connects the bars around the center and defines a hole (circular or other shapes) at the center. The hole in turn indicates the center position at which the shooter should place the red dot 116 provided by the scope 102. In this manner, the parallax mitigation device 100 of the present disclosure may eliminate the error caused by the parallax of the sight and give the shooter an accurate and consistent zero every time. In one embodiment, the radius of the hole defined by the connecting member 114 may be approximately one to two millimeters.

Figure 6:
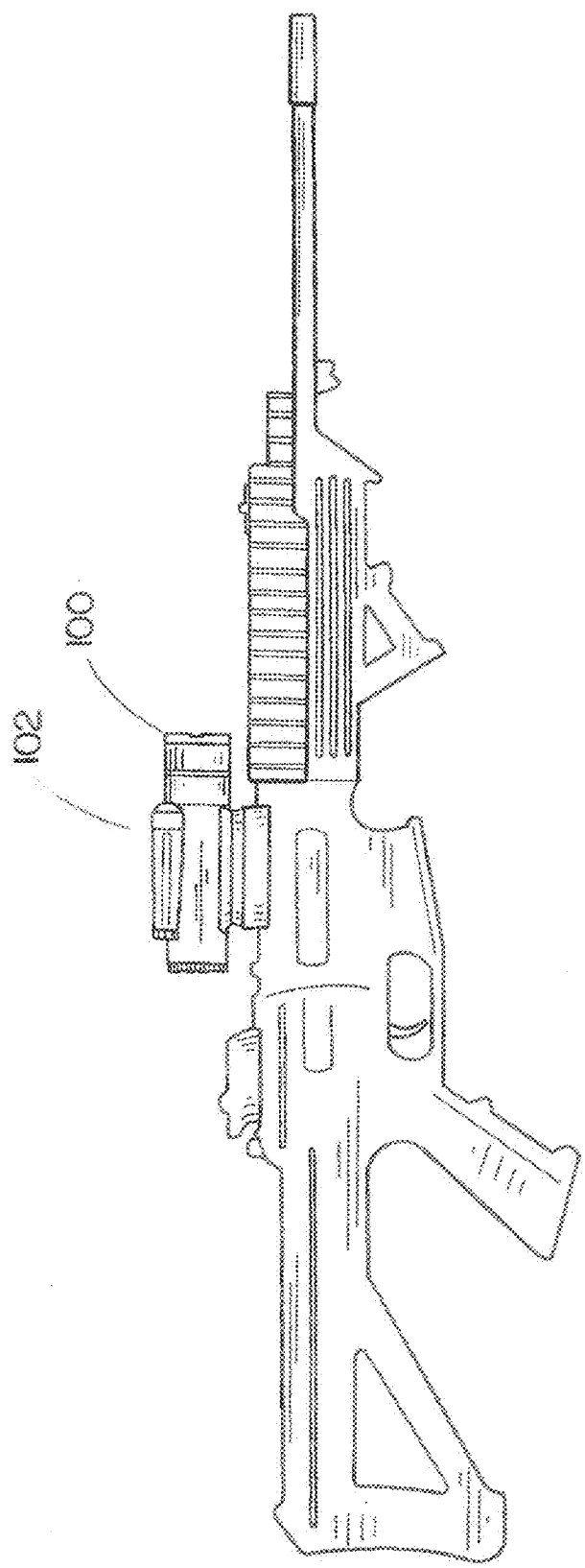
FIG. 6 is a side view of the parallax mitigation device and the red dot type scope, wherein the parallax mitigation device is mounted to the front portion of the red dot type scope.
Figure 7:
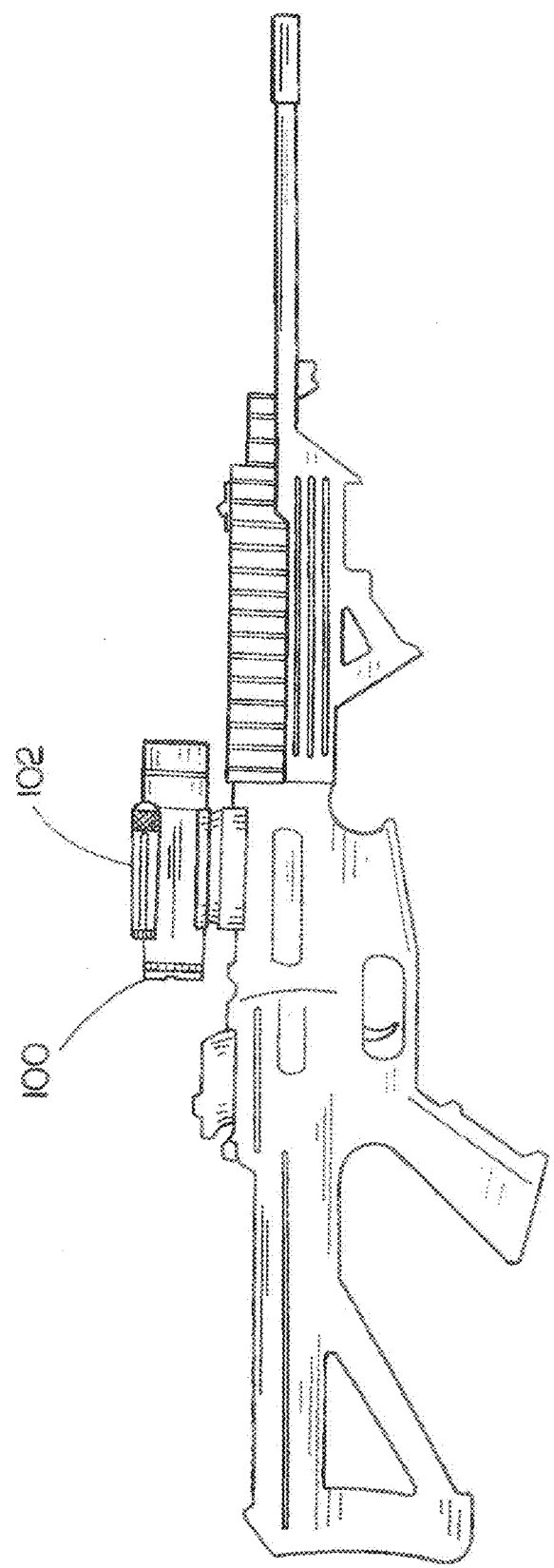
FIG. 7 is another side view of the parallax mitigation device and the red dot type scope, wherein the parallax mitigation device is mounted to the rear portion of the red dot type scope.

It is contemplated that the parallax mitigation device 100 may be positioned at the front of the scope 102 in various ways. The type of attachment could be of a slip on, flip up or any number of other methods to include those of an internal or illuminated design. For example, as illustrated in FIGS. 1 and 6, the front portion of the scope 102 may include a slot to accommodate an insertion of the parallax mitigation device 100. The design of the crosshairs could be of different configurations or colors as well as long as the purpose is to assist the shooter in exact centering of the red dot within the tube of the scope 102. It is also contemplated that the parallax mitigation device 100 may be positioned at the rear of the scope 102 to achieve the same results, as illustrated in FIG. 7. In general, the parallax mitigation device 100 may be placed in the optical path of the reflex scope (e.g., front, rear or within the scope) as long as it provides a reference to the shooter and thus helps the shooter to place the red dot in the center.

Figure 8:
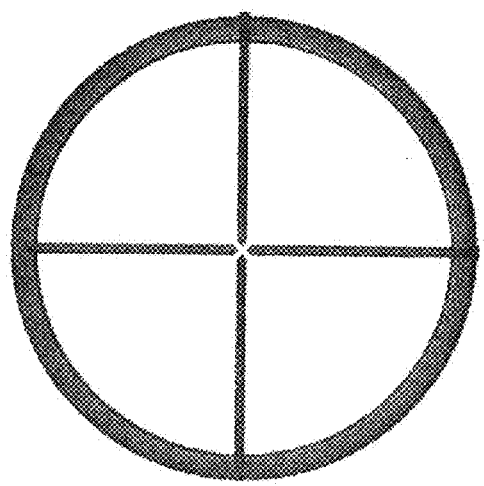
FIG. 8 is a top view of a parallax mitigation device having a standard crosshairs/reticle configuration.
Figure 9:
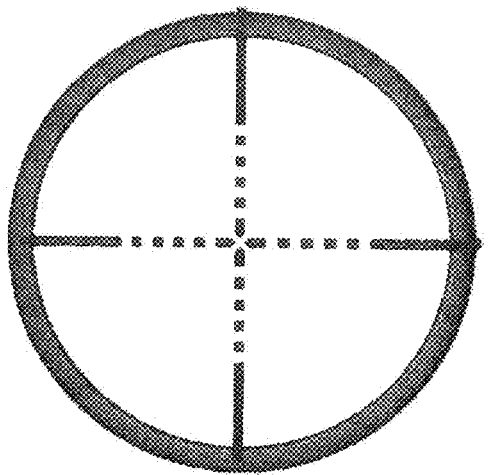
FIG. 9 is a top view of a parallax mitigation device having an offset crosshairs/reticle configuration.

It is also contemplated that the parallax mitigation device 100 may indicate the center position in a variety of ways. For instance, instead of utilizing the connecting member 114 supported by the bars to indicate the center position, other types of support members may be utilized without departing from the spirit and scope of the present disclosure. For example, a transparent/translucent support surface (e.g., glass) may be enclosed in the cylindrical housing 106. The support surface may have embedded and/or marked position indicators as shown in FIG. 8. Furthermore, an offset crosshairs/reticle as shown in FIG. 9 may also be utilized. Such crosshairs may be utilized to get consistent dot placement for off center testing/shooting purposes. Offset crosshairs may also be utilized to demonstrate the effects of incorrect placement as well as to validate the effectiveness of the parallax mitigation device 100. However, the reticle 104 as depicted in FIGS. 1 through 5 may be appreciated as this particular implementation does not introduce reflections and/or glares. Furthermore, the parallax mitigation device 100 utilizing the reticle 104 as depicted in FIGS. 1 through 5 may be modeled as a single-piece device, which may be easier to manufacture and maintain.

Figure 10:
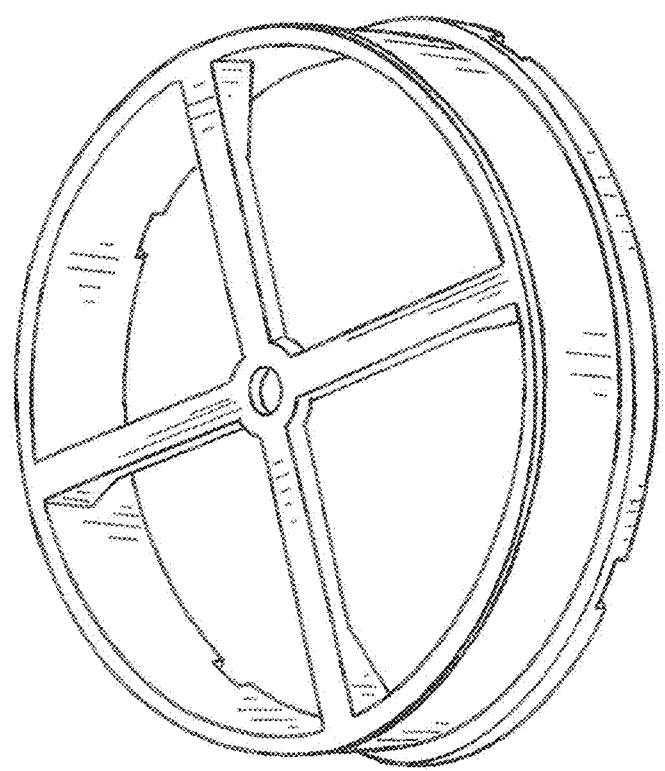
FIG. 10 is an isometric view of a parallax mitigation device utilizing friction fit mechanisms.

While the example above describes a threaded portion 108 for mounting the parallax mitigation device 100 to the scope 102, it is contemplated that other fastening mechanisms may be utilized for securing the parallax mitigation device 100 to the scope 102. For instance, the parallax mitigation device 100 as shown in FIG. 10 may utilize friction fit mechanisms to engage with the scope 102. Other mechanisms such as snap fit mechanisms or the like may be utilized without departing from the spirit and scope of the present disclosure.

Figure 11:
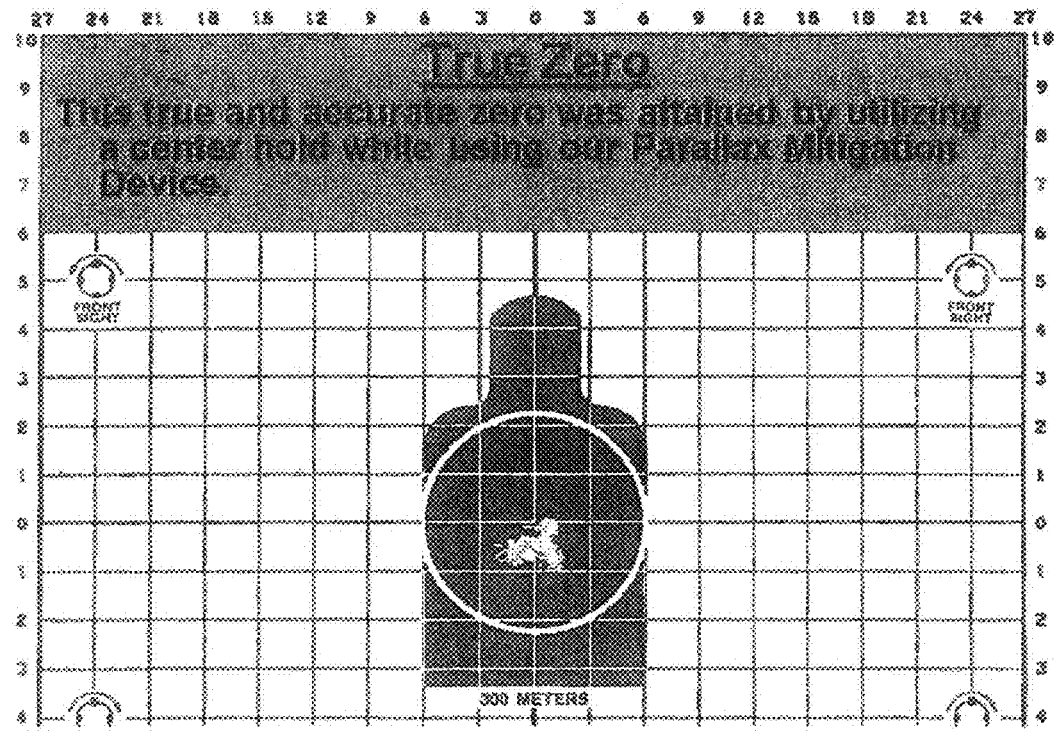
FIG. 11 is an illustration depicting a set of test results having true and accurate zero.
Figure 12:
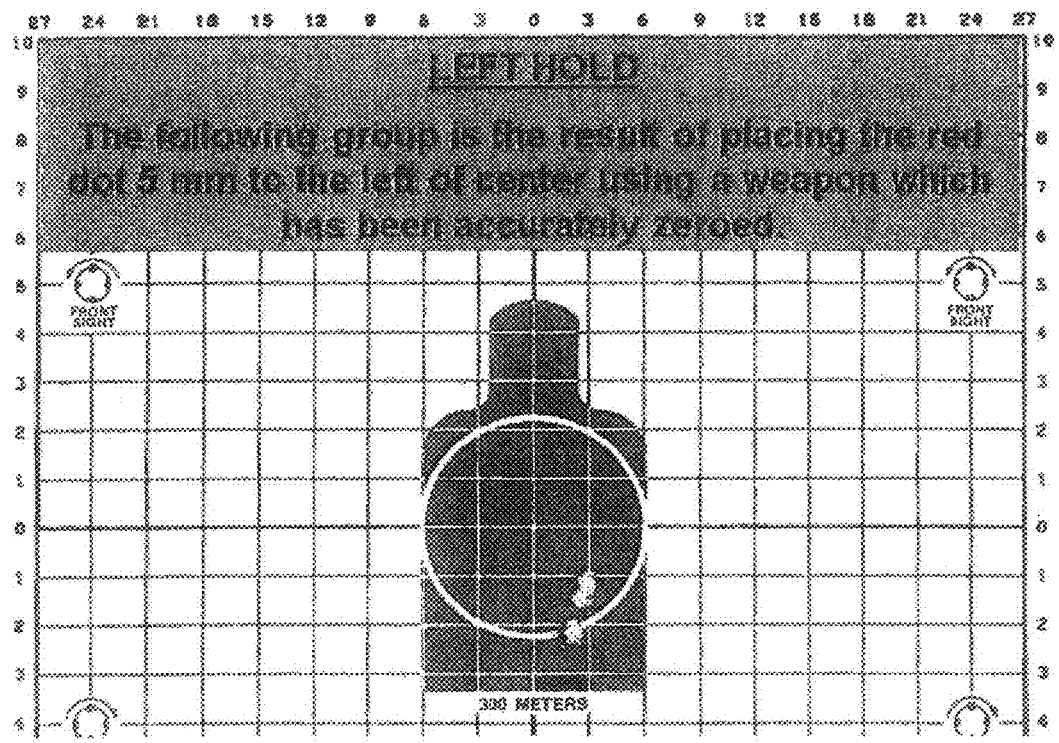
FIG. 12 is an illustration depicting a set of left hold test results.
Figure 13:
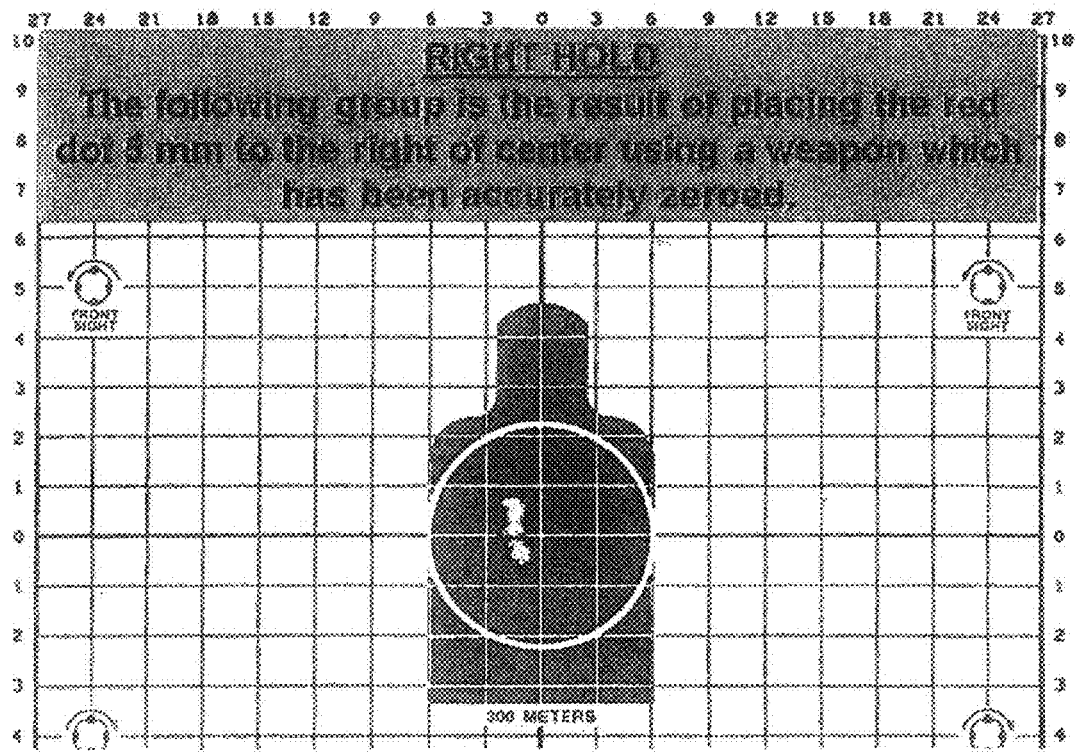
FIG. 13 is an illustration depicting a set of right hold test results.
Figure 14:
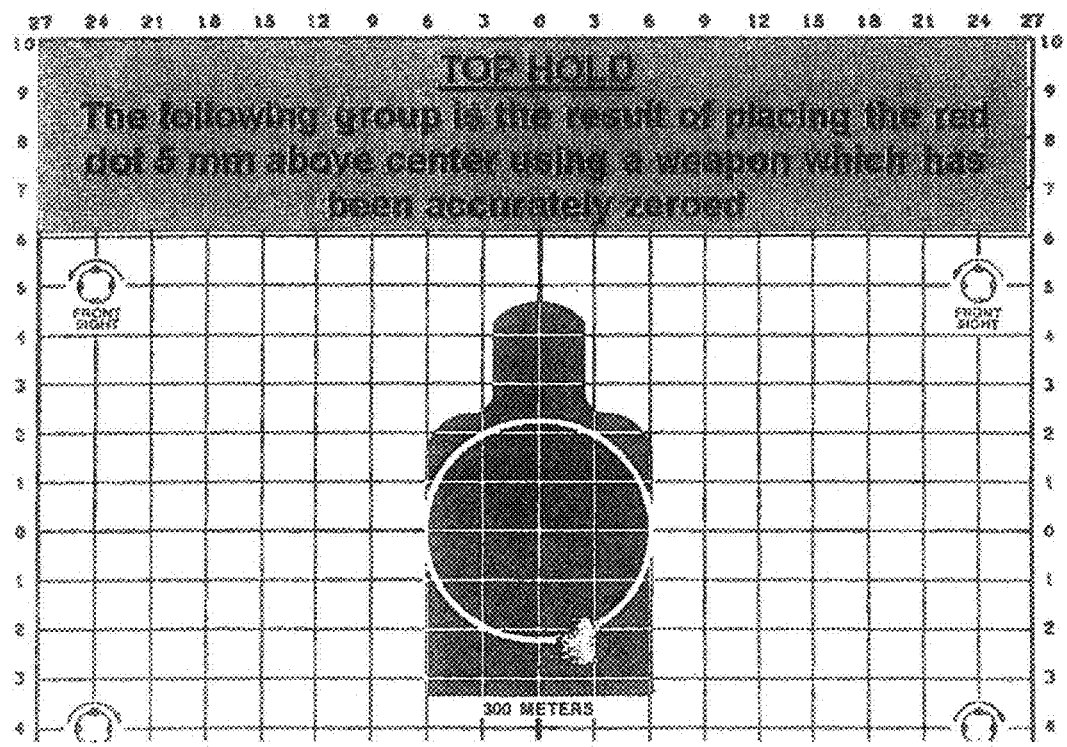
FIG. 14 is an illustration depicting a set of top hold test results.
Figure 15:
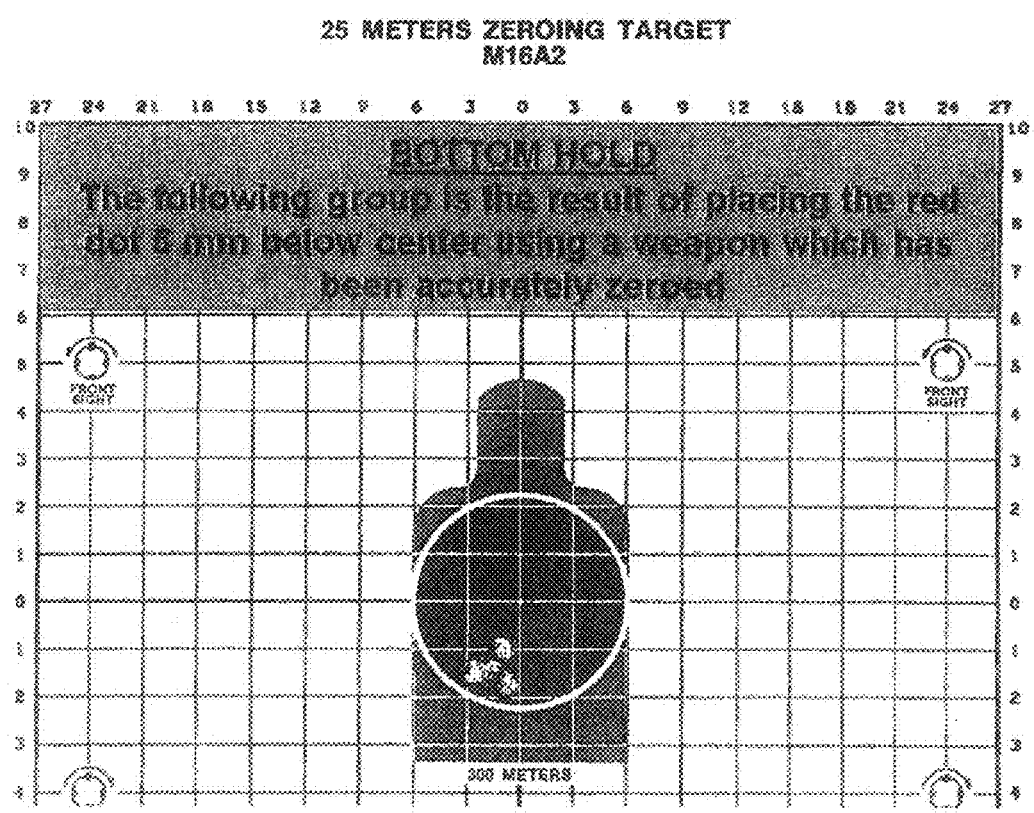
FIG. 15 is an illustration depicting a set of bottom hold test results.

Referring generally to FIGS. 11 through 17, a series of test results are illustrated. FIG. 11 illustrates a set of test results having true and accurate zero. This set was attained by utilizing a center hold while using the parallax mitigation device 100. FIG. 12 illustrates a set of left hold test results. This set was attained as a result of placing the red dot 5 mm to the left of center using a weapon which has been accurately zeroed. FIG. 13 illustrates a set of right hold test results. This set was attained as a result of placing the red dot 5 mm to the right of center using a weapon which has been accurately zeroed. FIG. 14 illustrates a set of top hold test results. This set was attained as a result of placing the red dot 5 mm above center using a weapon which has been accurately zeroed. FIG. 15 illustrates a set of bottom hold test results. This set was attained as a result of placing the red dot 5 mm below center using a weapon which has been accurately zeroed.

Figure 16:
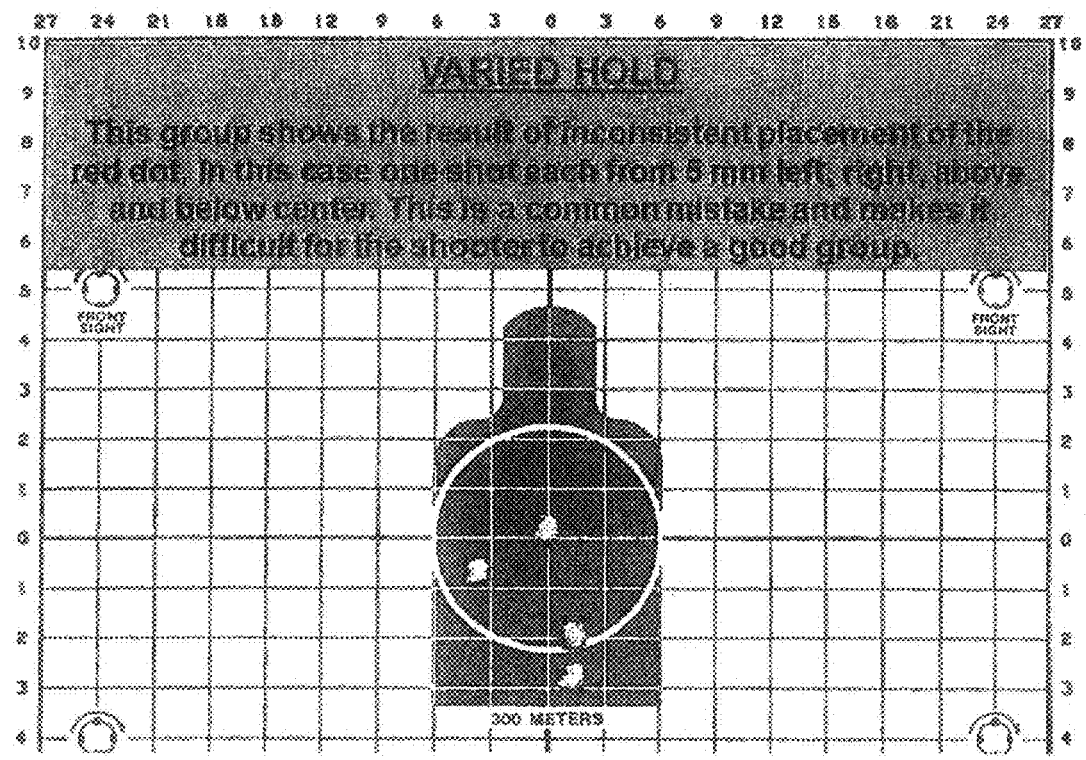
FIG. 16 is an illustration depicting a set of varied hold test results.
Figure 17:
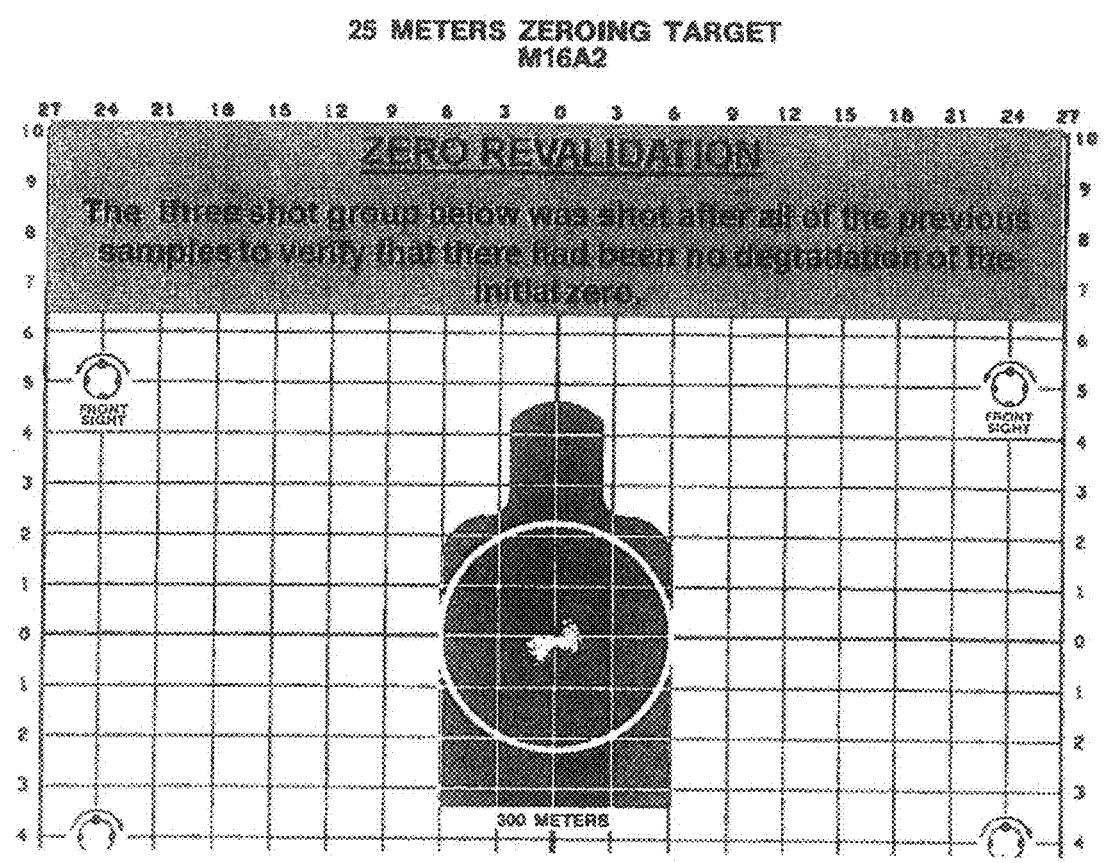
FIG. 17 is an illustration depicting a set of test results having true and accurate zero upon completion of the accuracy test.

Furthermore, FIG. 16 illustrates a set of varied hold test results. This set shows the result of inconsistent placement of the red dot. In this case one shot each from 5 mm left, right, above and below center. This is a common mistake and makes it difficult for the shooter to achieve a good group. To complete the verification of the accuracy, three shot groups was shot after all of the previous samples (FIGS. 11 through 16) to verify that there had been no degradation of the initial zero. The result of this last set is shown in FIG. 17.

As stated above, the parallax mitigation device in accordance with the present disclosure may be placed anywhere in the optical path of the reflex scope as long as it provides a reference to the shooter and thus helps the shooter to place the red dot in the center. It is contemplated that the placement of the parallax mitigation device in accordance with the present disclosure is not limited to the front or the rear end of the scope. That is, the parallax mitigation device may be placed within the scope and configured to be selectively engageable by the user.

It is also contemplated that the parallax mitigation device may be configured to indicate the center position in a variety of ways. For instance, in addition to utilizing a connecting member supported by bars and/or markings provided on one or more transparent/translucent support surfaces to indicate the center position, electronic displays, optical projection techniques and/or other mechanically engaged devices may also be utilized to indicate such center positions.

Figure 18:
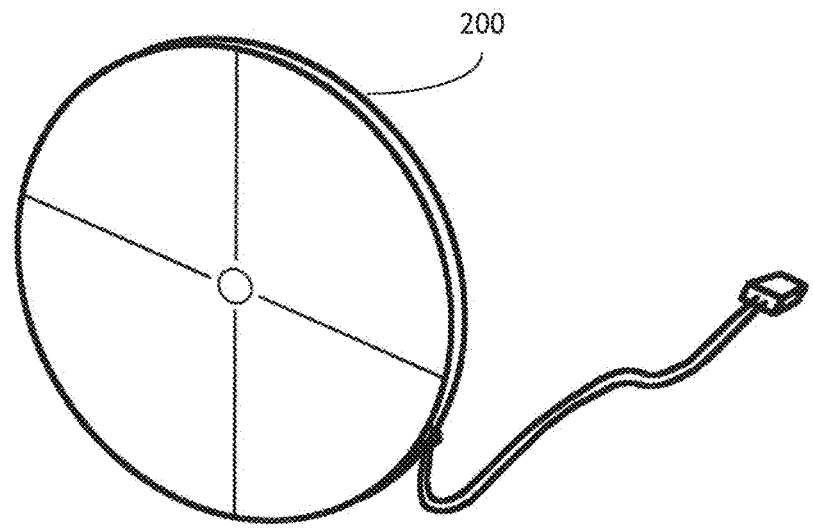
FIG. 18 is an isometric view depicting a parallax mitigation device when engaged.
Figure 22:
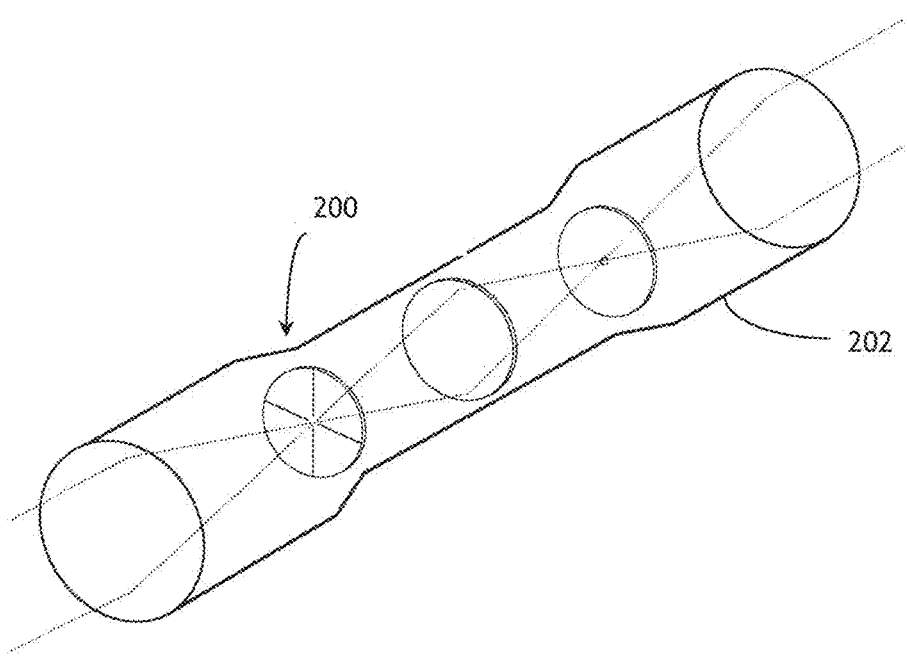
FIG. 22 is an isometric illustration depicting a parallax mitigation device installed within a sight.

For instance, as shown in FIGS. 18 and 22, a parallax mitigation device 200 in accordance with certain embodiments of the present disclosure is configured as an integrated component of the scope 202. While the parallax mitigation device 200 is shown to be positioned between the front and the rear end of the scope 202, it is understood that the parallax mitigation device 200 may also be positioned at the front or the rear end of the scope 202 without departing from the spirit and scope of the present disclosure.

Figure 19:
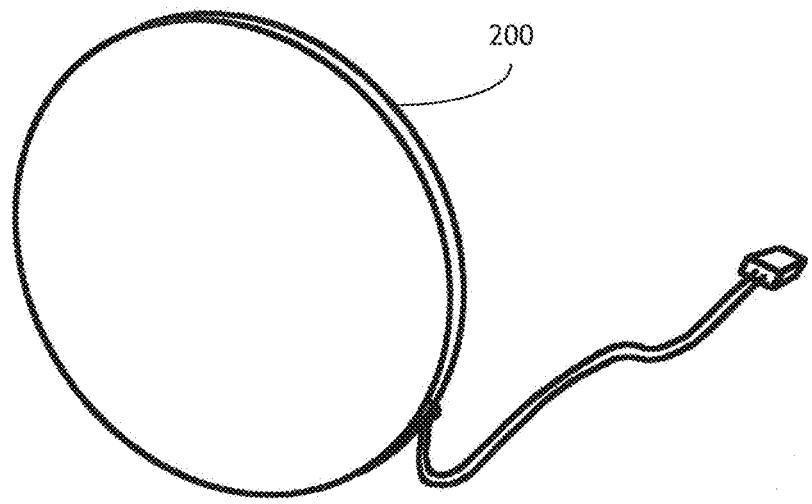
FIG. 19 is an isometric view depicting the parallax mitigation device when disengaged.
Figure 20:
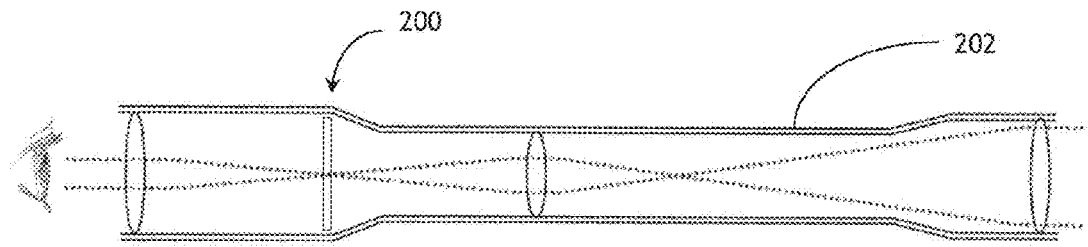
FIG. 20 is a cross-sectional view depicting a parallax mitigation device installed within a sight.

The parallax mitigation device 200 may include a transparent display in one embodiment. The transparent display may be configured as a see-through liquid-crystal display (LCD) or any optical/display device that provides a projected image when engaged without blocking the field of view through the scope 202. This allows the user of the scope 202 to selectively engage or disengage the parallax mitigation device 200. In this manner, when the parallax mitigation device 200 is engaged (as shown in FIG. 18), the center position indicator(s) are made visible to the user to help mitigate parallax. On the other hand, when the parallax mitigation device 200 is disengaged (as shown in FIG. 19), the center position indicator(s) are made substantially invisible to the user and do not cause substantial optical interference to the user.

It is contemplated that display devices such as liquid-crystal displays or the like may be utilized without departing from the spirit and scope of the present disclosure. In such implementations, the parallax mitigation device 200 may be electronically connected to a power source of the scope 202 via a power cord.

Figure 21:
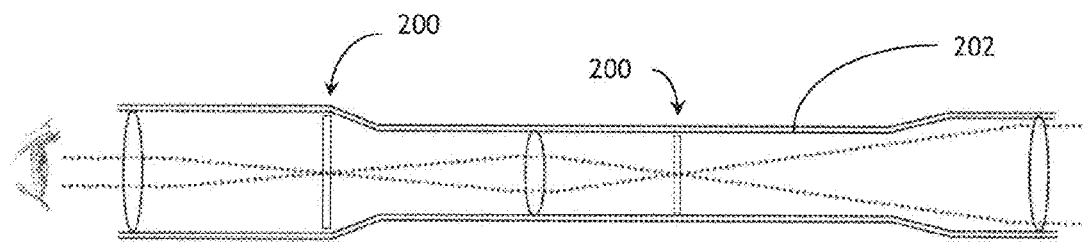
FIG. 21 is a cross-sectional view depicting more than one parallax mitigation device installed within a sight.

It is also contemplated that more than one of such parallax mitigation devices 200 may be utilized in a scope 202 for increased accuracy, as shown in FIG. 21. Alternatively, multiple parallax mitigation devices 200 may be utilized as multiple focal planes. For instance, one half of the center position indicator may be positioned on one device and the other half of the center position indicator may be positioned on the other device. In such a configuration, when the two halves are aligned, a complete image indicates no parallax.

Figure 23:
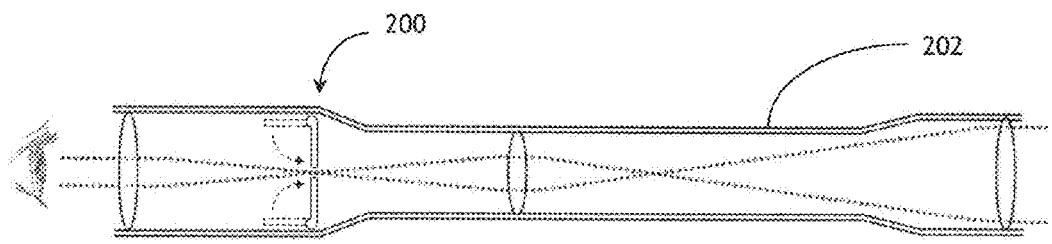
FIG. 23 is a cross-sectional view depicting an alternative parallax mitigation device installed within a sight.
Figure 24:
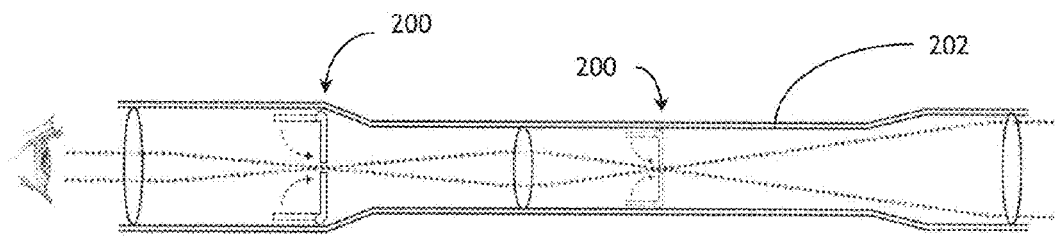
FIG. 24 is a cross-sectional view depicting more than one alternative parallax mitigation device installed within a sight.

Furthermore, alternative to the transparent display implementation, the parallax mitigation device 200 may also be engaged/disengaged mechanically. For instance, as depicted in FIGS. 23 and 24, the parallax mitigation device 200 may be mechanically rotated, slid or otherwise positioned into the optical path of the scope 202 when engaged for parallax mitigation. When the user needs to disengage the parallax mitigation device 200, it can then be mechanically rotated, slid or otherwise positioned outside of the optical path of the scope 202.

Figure 25:
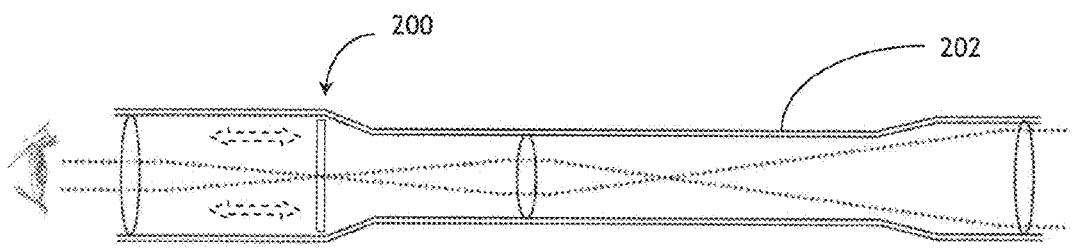
FIG. 25 is a cross-sectional view depicting another alternative parallax mitigation device installed within a sight.
Figure 26:
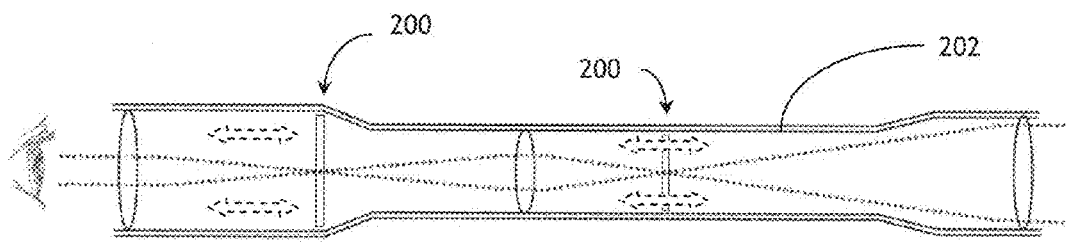
FIG. 26 is a cross-sectional view depicting more than one of the other alternative parallax mitigation device installed within a sight.

In another example, as depicted in FIGS. 25 and 26, the parallax mitigation device 200 may be mechanically shifted in or out of focus in order to be engaged or disengaged for parallax mitigation. That is, by shifting the parallax mitigation device 200 closer to or farther away from the user, the parallax mitigation device 200 may appear to be in or out of focus to the user. When the parallax mitigation device 200 appears to be in focus, the center position indicators on the parallax mitigation device 200 also appear to be in focus and sharp, allowing the user to use the center position indicators for parallax mitigation purposes. On the other hand, the more out of focus the parallax mitigation device 200 appears, the more blurred the center position indicators on the parallax mitigation device 200 appear to be, to the point where the center position indicators become substantially invisible to the user and do not cause substantial optical interference to the user.

In addition to the exemplary embodiments described above, it is contemplated that the parallax mitigation device may be mechanically engaged/disengaged in various other manners without departing from the spirit and scope of the present disclosure.

It is also understood that while crosshairs are utilized in the examples above to indicate the center positions, center position indicators may be configured in various other ways also without departing from the spirit and scope of the present disclosure.

Figure 27:
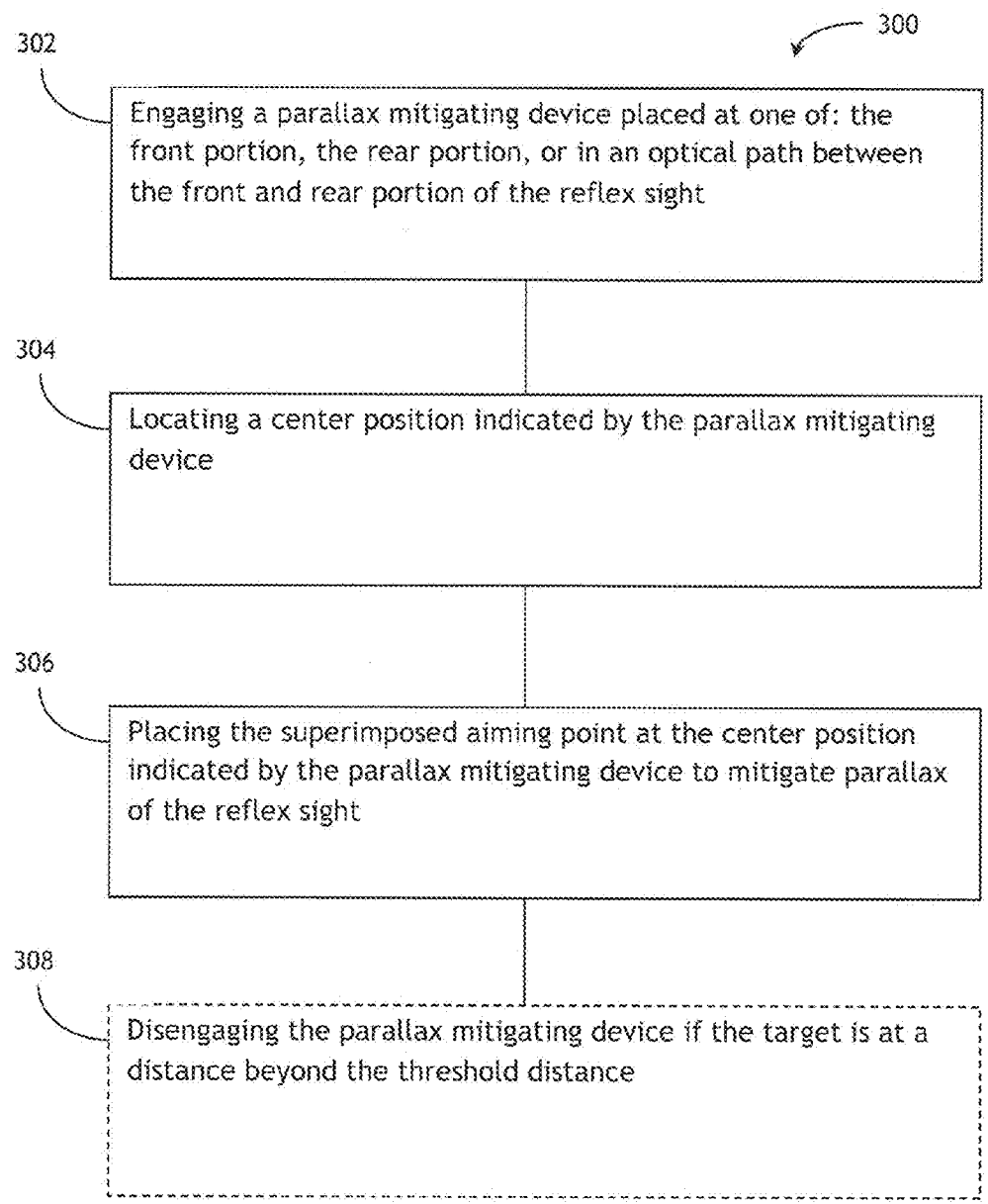
FIG. 27 is a flow diagram illustrating a method for mitigating parallax in a reflex sight.

Referring to FIG. 27, a flow diagram depicting a method 300 for mitigating parallax in a reflex sight is shown. A user may engage a parallax mitigating device in step 302. As described above, the parallax mitigating device may be located at one of: the front portion, the rear portion, or anywhere in the optical path between the front and rear portion of the reflex sight. In addition, the parallax mitigating device may be engaged electronically, optically or mechanically, as previously described. The user may locate the center position indicated by the parallax mitigating device in step 304, and place the aiming point at the center position indicated by the parallax mitigating device to mitigate parallax of the reflex sight in step 306.

It is contemplated that a reflex sight may be effectively parallax-free outside of a certain threshold distance (e.g., 50 meters), meaning that while the red dot moves around the inside of sight based on eye position, it always represents the point of aim. Therefore, the parallax mitigating device may be disengaged in step 308 if the target is at a distance beyond the threshold distance. In one embodiment, the parallax mitigating device only needs to be engaged if the target is at the threshold distance or closer.

While the examples above referenced reflex type optics, it is contemplated that the apparatus and methods in accordance with the present disclosure are not restricted to this use. The parallax mitigation device and method in accordance with the present disclosure are equally effective when utilized on a magnified optic when placed on the ocular lens. In this instance it guarantees correct alignment of the shooters eye behind the optic that accounts for parallax.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

It is believed that the system and method of the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory.

What is claimed is:

1. An apparatus, comprising:
    a reflex sight, the reflex sight includes a sight tube having a front portion for receiving light and a rear portion for providing a visual of a target and a projection of an aiming point superimposed on the visual to a user, the aiming point follows movements of an eye of the user and floats with respect to the sight tube; and
    a parallax mitigating device for placement at one of: the front portion, the rear portion, or in an optical path between the front and rear portion of the sight tube of the reflex sight, the parallax mitigating device configured for indicating a location indicator in a first mode of operation for the user to place the aiming point according to the location indicator to facilitate parallax mitigation of the reflex sight, the parallax mitigating device further configured for conditionally disengaging the location indicator in a second mode of operation to reduce optical interface to the user; and
    wherein the parallax mitigating device indicates the location indicator when a distance between the target and the reflex sight is within a predetermined threshold distance.

2. The apparatus of claim 1, wherein the parallax mitigating device comprises a plurality of equal length bars connected utilizing a connecting member, and wherein the connecting member defines a hole at the center position.

3. The apparatus of claim 1, wherein the parallax mitigating device comprises a transparent support surface, and wherein the transparent support surface includes markings to indicate the center position.

4. The apparatus of claim 1, wherein the parallax mitigating device comprises a cylindrical housing, and wherein the cylindrical housing is removably secured to at least one of: the front portion of the reflex sight or the rear portion of the reflex sight.

5. The apparatus of claim 1, wherein the parallax mitigating device disengages the location indicator when the distance between the target and the reflex sight greater than the predetermined threshold distance.

6. The apparatus of claim 5, wherein the parallax mitigating device is an integrated component of the reflex sight.

7. A method for mitigating parallax in a reflex sight, the reflex sight includes a sight tube having a front portion for receiving light and a rear portion for providing a visual of a target and a projection of an aiming point superimposed on the visual to a user, the aiming point follows movements of an eye of the user and floats with respect to the sight tube, the method comprising:
    engaging a parallax mitigating device placed at one of: the front portion, the rear portion, or in an optical path between the front and rear portion of the sight tube of the reflex sight when a distance between the target and the reflex sight is within a predetermined threshold distance;

locating a center position indicated by the parallax mitigating device;

placing the superimposed aiming point that follows the movements of the eye of the user at the center position indicated by the parallax mitigating device to mitigate parallax of the reflex sight; and disengaging the parallax mitigating device when the distance between the target and the reflex sight is greater than the predetermined threshold distance.

8. The method of claim 7, wherein engaging the parallax mitigating device comprises physically placing the parallax mitigating device at the front portion or the rear portion of the reflex sight.

9. The method of claim 7, wherein engaging the parallax mitigating device comprises electronically engaging the parallax mitigating device, wherein the center position is electronically displayed.

10. The method of claim 7, wherein engaging the parallax mitigating device comprises optically engaging the parallax mitigating device, wherein the center position is optically illuminated.

11. The method of claim 7, wherein when the parallax mitigating device is disengaged, indication of the center position is made substantially invisible to the user.

12. The method of claim 7, wherein the threshold distance is 50 meters.

13. An apparatus, comprising:

a reflex sight, the reflex sight includes a sight tube having a front portion for receiving light and a rear portion for providing a visual of a target and a projection of an aiming point superimposed on the visual to a user, the aiming point follows movements of an eye of the user and floats with respect to the sight tube; and means for mitigating parallax, the parallax mitigating means being placed at one of: the front portion, the rear portion, or in an optical path between the front and rear portion of the sight tube of the reflex sight, the parallax mitigating means configured for indicating a location indicator in a first mode of operation for the user to place the aiming point according to the location indicator to facilitate parallax mitigation of the reflex sight, the parallax mitigating means further configured for conditionally disengaging the location indicator in a second mode of operation to reduce optical interference to the user; and wherein the parallax mitigating means indicates the location indicator when a distance between the target and the reflex sight is within a predetermined threshold distance.

14. The apparatus of claim 13, wherein the parallax mitigating means disengages the location indicator when the distance between the target and the reflex sight greater than the predetermined threshold distance.

15. The apparatus of claim 13, wherein the parallax mitigating means changes position with respect to the reflex sight, and the center position is mechanically engageable.

16. The apparatus of claim 13, wherein the parallax mitigating means includes at least two lenses with markings, and the center position is indicated by an alignment of the markings on the two lenses.

17. The apparatus of claim 13, wherein when the parallax mitigating means disengages the location indicator, the location indicator is made substantially invisible to the user.

* * * * *